C. A. CUNNINGHAM.
DECOY.
APPLICATION FILED SEPT. 21, 1909.
957,750.
Patented May 10, 1910.
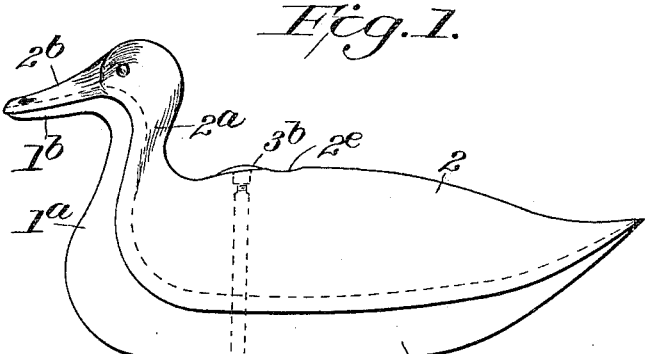
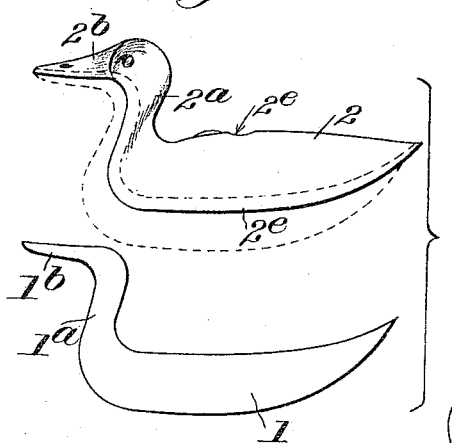
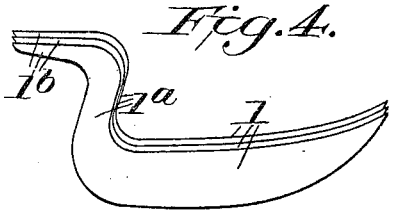
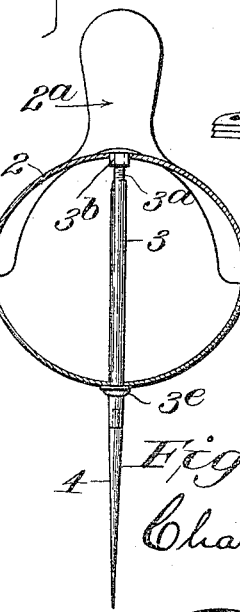
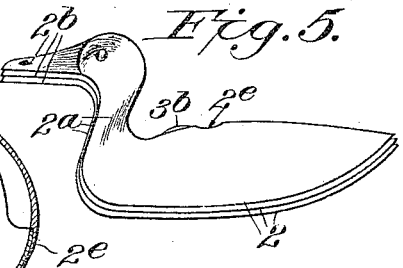
Witnesses
Inventor
Charles A. Cunningham
By Alexander & Dowell
Attorneys

UNITED STATES PATENT OFFICE.

CHARLES A. CUNNINGHAM, OF CHICO, CALIFORNIA.

DECOY.

957,750. Specification of Letters Patent. Patented May 10, 1910.

Application filed September 21, 1909. Serial No. 518,855.

*To all whom it may concern:*

Be it known that I, CHARLES A. CUNNINGHAM, of Chico, in the county of Butte and State of California, have invented certain new and useful Improvements in Decoys; and I hereby declare that the following is a full, clear, and exact description thereof, reference being had to the accompanying drawings, which form part of this specification.

This invention is an improvement in decoys for use by hunters to attract water fowl, and its object is to provide a decoy that is very light; that can be used either on land or on water, and which can be knocked down and nested for transport, so that a large number of them can be packed into small space so as to be conveniently carried by the hunter.

The invention will be clearly understood from the following description of the decoy illustrated in the accompanying drawings, in which:

Figure 1 is a view of a complete decoy constructed in accordance with the invention. Fig. 2 is a detail view showing the upper and lower halves of the decoy separated. Fig. 3 is a transverse section of a decoy. Figs. 4 and 5 are detail views showing how the lower and upper parts of such decoys can be nested. Fig. 6 is a detail view of the connecting device. Fig. 7 is a detail view of a spud.

The decoy is made in two longitudinal parts, preferably separable on substantially horizontal lines, so that the lower part 1 will form a float and the upper part 2 will form a cover for the float. These parts are complemental, and when fitted together the decoy has approximately the form and appearance of the fowl to be decoyed, such as a goose or duck. As shown the lower part 1 has a neck portion 1$^a$ and a lower bill portion 1$^b$; while the upper part has a neck portion 2$^a$ and a head and upper bill portion 2$^b$. The parts may be made of any suitable material, such as aluminum; or fabric, compressed fiber, or papier mâché, suitably water proofed. The upper part 2 is provided on its edges with flanges 2$^e$ which fit over the edges of the part 1. These parts are preferably made to fit neatly together so as to prevent ready inflow of water when the parts are fitted together, as in Figs. 1 and 3; but it is not necessary to have a water-tight joint therebetween.

The parts may be detachably united when assembled by any suitable means; as shown, and as at present preferred, a rod or tubular stem 3 is inserted through the bottom part 1 and has a threaded engagement with a retainer 3$^b$ attached to the upper part 2. This retainer may be a nut as shown, and the upper end of the stem 3 may be threaded as shown at 3$^a$ to engage said nut. The retainer 3$^b$ may be fastened to part 2 in any convenient manner. The stem 3 may be inserted through a small aperture in the lower part 1 and may be provided with a flange 3$^e$ which makes a close joint with the under side of the part 1; or any suitable means may be employed to make a close but detachable joint between the stem 3 and the bottom part 1 when the decoy is assembled.

A rod 4 of wood or metal may be connected to the lower end of the stem 3 and used as a spud to keep the decoy in position; or a weighted cord (not shown) may be attached to the lower end of the stem so as to keep the decoy from floating too far away, and to recover it if it should sink. An opening 2$^e$ may be made in part 2 near the retainer 3$^b$ to admit the fingers, and facilitate engagement of the stem with the retainer when assembling the parts.

When the decoys are to be stored or transported the stem is removed, and the parts 1 and 2 separated; any number of similar parts 1 may be then nested together, as indicated in Fig. 4, and like parts 2 can be similarly nested together as indicated in Fig. 5. Thus a large number of the decoys can be packed in a very small space. The manner of using the decoy needs no explanation, being well known to sportsmen.

It will be observed that the line of division between the upper and lower portions of my decoy is such as gives both the general outline of the wings and mouth of the bird to be decoyed, thus affording a more deceptive appearance to them.

Having described my invention what I claim as new and desire to secure by Letters Patent thereon is:

1. A decoy comprising a thin hollow body divided longitudinally and transversely on a substantially median line, extending from end to end of the decoy, into upper and lower separable halves, the lower half being adapted to float the decoy and the upper half adapted to fit over the lower half to impart a bird-like appearance to the decoy, each half being adapted when separated to be nested for transport with similar halves of like decoys.

2. A decoy, composed of a body divided longitudinally and transversely through its head, neck and body into separable halves, each half being adapted, when separated, to be nested for transport with similar halves of like decoys.

3. A decoy, composed of a body divided longitudinally and transversely through its head, neck and body into separable halves, the lower half being adapted to float the decoy and the upper half adapted to fit over the lower half to impart a bird-like appearance to the decoy, and means for detachably connecting the halves, substantially as described.

In testimony that I claim the foregoing as my own, I affix my signature in presence of two witnesses.

CHARLES A. CUNNINGHAM.

Witnesses:
C. L. STILSON,
BERNICE BALLEW.